April 7, 1953
P. SZOSTEK
2,633,636
ELECTRIC HEDGE CUTTER
Filed Dec. 23, 1950
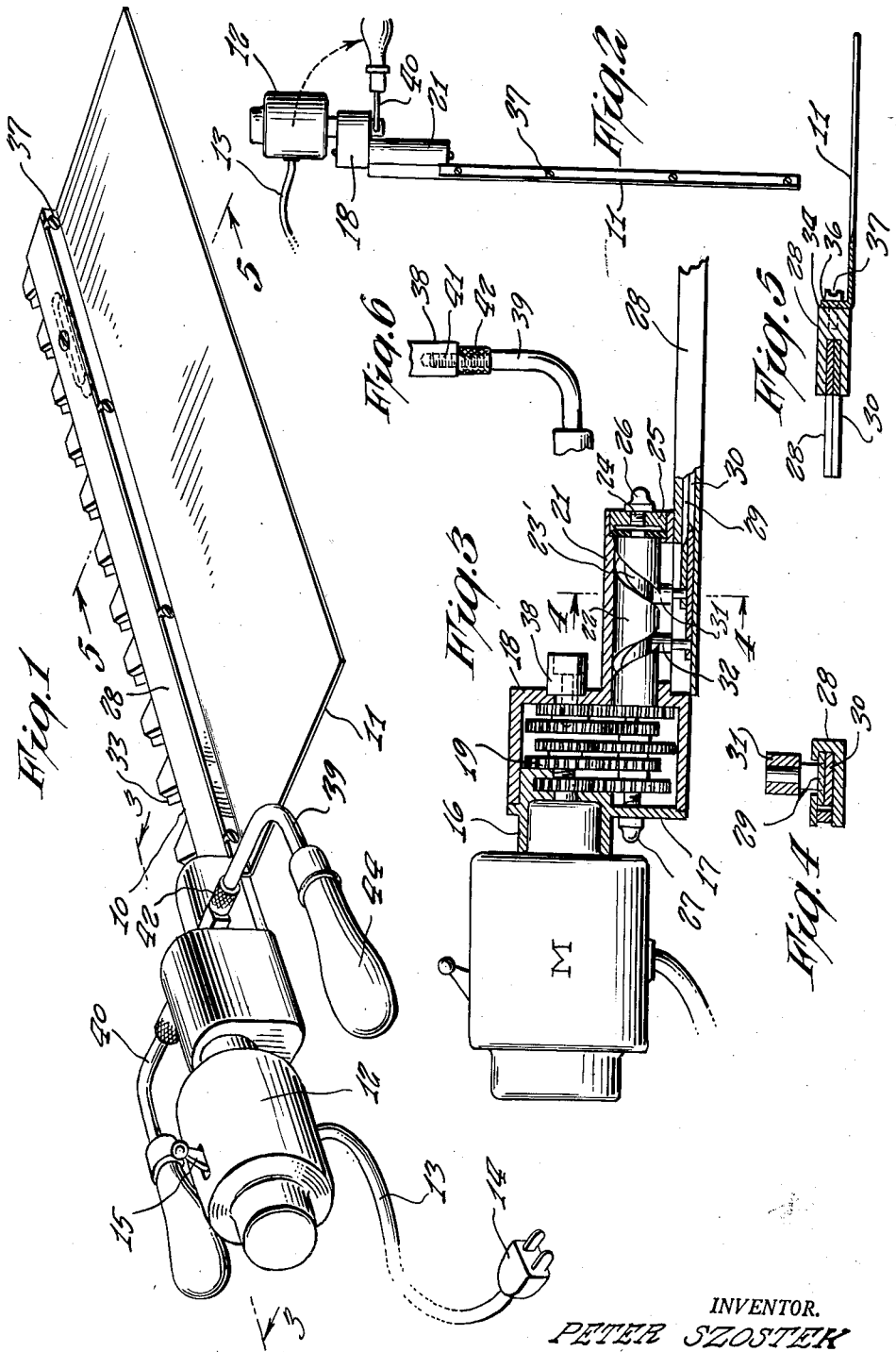
INVENTOR.
PETER SZOSTEK
BY
Carl Miller
ATTORNEY Patented Apr. 7, 1953

2,633,636

UNITED STATES PATENT OFFICE 2,633,636

ELECTRIC HEDGE CUTTER

Peter Szostek, Brooklyn, N. Y.

Application December 23, 1950, Serial No. 202,556

2 Claims. (Cl. 30—216)

This invention relates to an electrically operated hedge cutter.

It is an object of the present invention to provide an electric hedge cutter with a detachable guide member adapted to support the cutter on the top of the hedge so that it can be adequately and properly guided while cutting other portions of the hedge, the guide sliding over the cut ends of the hedge.

Other objects of the present invention are to provide an electrical hedge cutter with a guide for supporting the hedge cutter upon the hedge which is of simple construction, inexpensive to manufacture, easy to attach to the hedge cutter, formed of one piece, light in weight, adds little weight to the hedge cutter, durable, rigid and efficient in use.

For other objects and for a better understanding of the invention, reference may be had to the following detailed description taken in connection with the accompanying drawing, in which Fig. 1 is a perspective view of the electric hedge cutter and of the guide attached thereto and embodying the features of the present invention.

Fig. 2 is a side elevational view of the hedge cutter and of the guide.

Fig. 3 is an enlarged fragmentary sectional view taken generally on line 3—3 of Fig. 1.

Fig. 4 is a transverse sectional view taken on line 4—4 of Fig. 3.

Fig. 5 is a transverse sectional view taken on line 5—5 of Fig. 1.

Fig. 6 is a detail fragmentary view showing one of the handles and its connection with the cutter.

Referring now to the figures, the hedge cutter is indicated generally at 10 and the guide, embodying the features of the present invention, is indicated at 11. An electric motor 12 is supplied with current through a cable cord 13 and a plug 14 that can be connected to a house outlet. The electric motor has a stop and start switch handle 15 easily accessible at the top of the motor. The motor is supported in a projection 16 of a gear housing or box 17. This box has a separable part 18 and houses a gear train 19. Extending outwardly from the part 18 is a projection 21 having a cam cylinder 22 with a cam groove 23 therein. A shaft 24 extends through the projection 21 and the gear box and from an end member 25. Nuts 26 and 27 are connected to the opposite ends of the shaft to fix the shaft. Extending forwardly from under the projection 21 is a bar structure 28 for housing and slidably supporting cutter bar members 29 and 30 having respectively cam followers 31 and 32 working in the cam grooves 23. The grooves 23 are run in the opposite direction and will move the cutter bars 29 and 30 bearing cutting teeth 33 in opposite directions. The cutting action is accordingly effected upon the ends of the hedge. The cutter bar structure 28 has a rear vertical face 34 to which guide 11 is attached. The guide 11 has an upstanding flange 36 and is attached by screws 37 extending through the flange to the vertical side edge of the bar structure 28.

Fixed to the end of the housing member 18 is a bracket projection 38 to which handles 39 and 40 are respectively attached. The connection is effected by a threaded end 41 which can be extended into the bracket 38 and locked therewith by a locking sleeve 42. The handles have hand grip portions 44 respectively and by these handles the entire hedge cutter along with the guide is supported.

The handles 39 and 40 can be angled to a vertically extending position, in the manner as shown in Fig. 2, by loosening the locking sleeves and turning the handles up.

It will be seen that with the drive mechanism afforded by the cam with the double grooves 23 and 23' that double action of the cutter bars can be simultaneously effected. This will give a quicker cutting action upon the hedge and with the guide 11 being used in a steady and easy and quick cutting of the hedge can be effected. The handles are adjustable and easily made so that they can be conveniently gripped. With these handles the hedge cutter can be supported either in a horizontal position, as shown in Fig. 1, or in a vertical position, as shown in Fig. 2.

While various changes may be made in the detail construction, it shall be understood that such changes shall be within the spirit and scope of the present invention as defined by the appended claims.

Having thus set forth and disclosed the nature of my invention, what is claimed is:

1. A hedge cutting device comprising an electric motor, a gear housing connected to the electric motor, a gear train within the gear housing, a sleeve projection extending from the gear housing, a cam having opposed cam grooves therein rotatable within said sleeve projection and connected to the gears to be driven by the same, a cutter bar structure extending from the sleeve projection, cutter bars operable within the cutter bar structure, cam followers connected respectively to the cutter bars and said cam followers working respectively in the oppositely extending grooves of the cam whereby to effect a sliding of the cutter bars relative to one another through the cutter bar structure.

2. A hedge cutting device comprising an electric motor, a gear housing connected to the electric motor, a cutter bar structure extending outwardly from the gear housing, drive means within the gear housing, cutter bars operable in the cutter bar structure and connected to the drive mechanism, and handles extending respectively to the opposite sides of the gear housing, a bracket upon the gear housing having threaded openings, said handles being angularly bent and having threaded portions, and locking sleeves associated with the threaded end portions, respectively, and the said sleeves locking the handles in differently adjusted positions upon tightening the said locking sleeves on the said threaded portions of the said handles.

PETER SZOSTEK

REFERENCES CITED

The following references are of record in the file of this patent:

UNITED STATES PATENTS

| Number | Name | Date |
| --- | --- | --- |
| 999,135 | Volnagel | July 25, 1911 |
| 1,285,203 | Jaeger | Nov. 19, 1918 |
| 1,349,004 | Manley | Aug. 10, 1920 |
| 1,714,778 | Hansen | May 28, 1929 |
| 1,996,624 | Moleski | Apr. 2, 1935 |
| 2,168,703 | Dziedic | Aug. 8, 1939 |
| 2,281,189 | Wright | Apr. 28, 1942 |
| 2,558,459 | Podner | June 26, 1951 |